April 10, 1928.
W. TIMSON
1,665,722
AUTOMATIC OR SEMIAUTOMATIC WEIGHING APPARATUS
Filed June 8, 1926
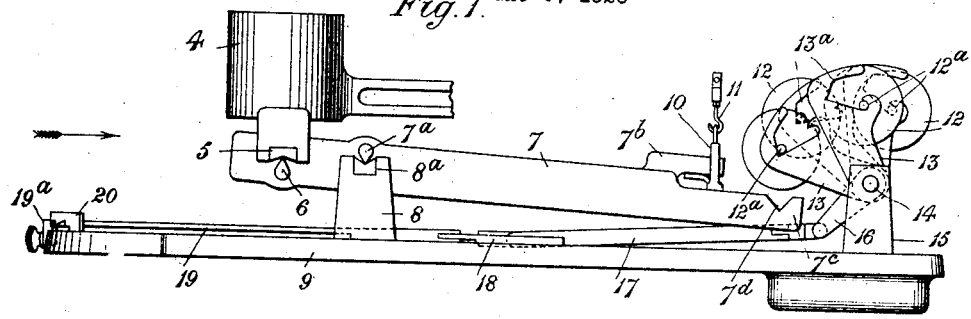
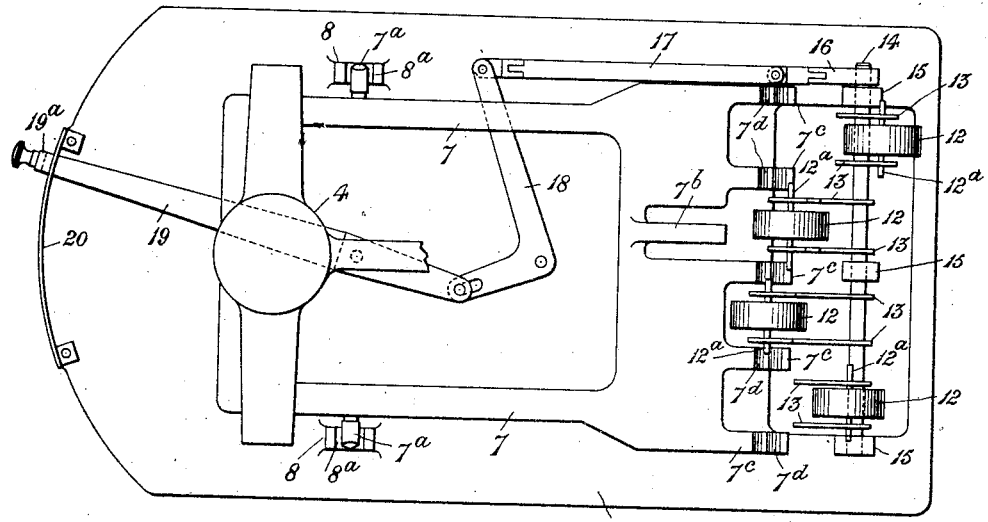
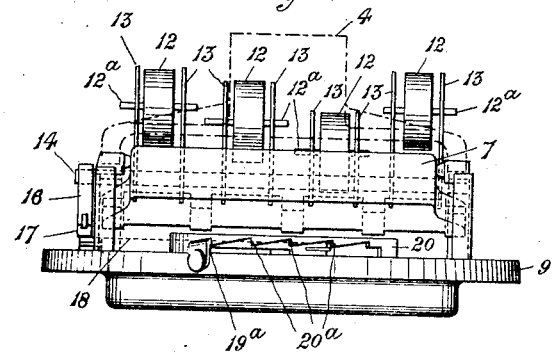
Inventor: William Timson

Patented Apr. 10, 1928.

1,665,722

UNITED STATES PATENT OFFICE.

WILLIAM TIMSON, OF SOHO FOUNDRY, BIRMINGHAM, ENGLAND, ASSIGNOR TO W. & T. AVERY, LIMITED, OF BIRMINGHAM, ENGLAND.

AUTOMATIC OR SEMIAUTOMATIC WEIGHING APPARATUS.

Application filed June 8, 1926, Serial No. 114,429, and in Great Britain May 4, 1926.

This invention has reference to improvements in or relating to automatic or semiautomatic weighing apparatus, and relates particularly to weighing apparatus of the aforesaid kind wherein the normal capacity of the scale can be increased by the addition to or removal from the scale lever of a further dead weight or weights.

The present invention has for its object the provision of an improved means for increasing the capacity of weighing apparatus of the aforesaid kind.

The invention consists of an improved weighing apparatus of the kind hereinbefore referred to having a plurality of weights operating in conjunction with a plurality of supporting members secured on a spindle adapted to be rotated through a linkage for depositing or removing the said weights on or from the scale lever, said members being spaced on the said spindle at varying angles, whereby the weights may be successively deposited on or removed from the scale lever. The invention further resides in the provision of a notched positioning plate for the actuating means which ensures that the weights must be either entirely deposited on the scale lever or removed therefrom. The invention also resides in the details of construction.

The invention will now be described with particular reference to the accompanying sheet of drawings which illustrate somewhat diagrammatically a means of carrying the invention into effect.

Figure 1 is a side elevation of the weight depositing mechanism and sufficient of a weighing scale as is necessary to an understanding of the invention.

Figure 2 is a plan of Figure 1, and

Figure 3 is an end elevation of Figure 1 looking in the direction of the arrow in the said figure.

The scale pan (not shown) is mounted on a bracket 4 provided with bearing blocks 5 supported on knife-edges 6 secured to one end of a scale lever 7, said lever being of the first order of levers and fulcrumed on knife-edges $7^a$ supported on bearing blocks $8^a$ carried by standards 8 secured to the base 9 of the scale. The scale lever 7 is provided adjacent its inner end with a projection $7^b$ which has an anti-friction connection with a schackle 10 depending from a hook 11 secured to the lower end of a flexible ribbon or the like (not shown), the other end whereof has connection with and effects the operation of the resistant and indicating mechanism in known manner. At its inner end the scale lever 7 is formed with a plurality of jaws $7^c$, each of which is provided with a V-shaped depression $7^d$ for the accommodation therein and the support of the spindles $12^a$ projecting from each side of a plurality of weights 12 adapted to be deposited on the scale lever 7 when it is desired to increase the capactiy of the scale, one or more of the weights 12 being deposited on the lever 7 according to the degree by which capacity of the scale is to be increased.

In their out of action position the projecting spindles $12^a$ of these weights 12 engage within the gapped sections $13^a$ formed in a plurality of pairs of jawed members 13 secured on a spindle 14 rotatably mounted in bearings carried by brackets 15 secured to the base 9. The several jawed members 13 are secured on the spindle 14 at varying angles whereby the weights 12 can be deposited or removed successively from the scale lever 7 as may be desired.

Secured to the spindle 14 at one end thereof is a crank 16 to which is pivotally connected an end of a rod 17, the other end whereof has pivotal connection to one arm of a horizontally disposed bell crank lever 18 pivotally mounted on the base 9 of the scale, the other arm of the said lever having a pin and slot connection with the inner end of an operating lever 19 pivotally mounted on the scale base. The outermost portion of the said lever is formed with a bent section $19^a$ and projects through a slot formed in the base housing (not shown). The outermost portion of the said lever is adapted to cooperate with a notched guide plate 20, the notches $20^a$ whereof are formed with a short vertical face and relatively long inclined face, whereby when the lever 19 is positioned within the said notches, it slides up the inclined face and ultimately abuts the vertical face of the notch by virtue of the inherent resilience of the said lever 19.

It will be appreciated that when it is desired to increase the capacity of the scale, the lever 19 is moved in the notched guide 20, and if moved one notch the said lever 19, through the bell crank 18, arm 17 and crank 16 connected thereto, rotates the spindle 14 sufficiently to deposit one of the weights 12 on the scale lever 7, thereby increasing the capacity of the scale to the desired amount. If it is desired to further increase the capacity, the lever 19 is advanced another notch and so on until the capacity of the scale has been increased by the desired amount.

It will be seen that the motion of the lever in the opposite direction successively lifts the added weights off the scale. By reason of the formation of the notches 20ª in the guide plate 20 it is ensured that the lever 19 must always abut the vertical face of each groove, since the lever will move upwardly along the inclined face of each groove until it attains the said position by virtue of the inherent elasticity of the metal from which it is made, whereby it is ensured that the lever 19 can only occupy such a position that the additional weights 12 are either deposited on the scale lever 7 or entirely removed therefrom, thereby preventing fraudulent manipulation of the weight depositing mechanism.

It will be understood that the means are preferably embodied for effecting an indication of the number of weights deposited on the scale pan, or the weight to be added to the indication given by the chart, or, again, means may be incorporated for effecting a change of the chart or the addition or removal of a weight.

Claims:—

1. A weighing apparatus comprising a rotatable spindle, a plurality of jaws secured on said spindle at varying angles, a plurality of weights adapted to be carried in their non-acting position by said jaws, a scale lever, a plurality of jaws on said scale lever for receiving said weights and means for rotating the said spindle whereby the weights may be deposited or removed from the scale lever.

2. A weighing apparatus comprising a rotatable spindle, a plurality of jaws secured on said spindle at varying angles, a plurality of weights adapted to be carried in their non-acting position by said jaws, a scale lever, a plurality of jaws formed at one end of said scale lever, each pair of jaws being adapted to receive one of said weights and a linkage for rotating the spindle for depositing or removing the said weights on or from the jaws on the scale lever.

3. A weighing apparatus comprising a rotatable spindle, a plurality of jaws secured on said spindle at varying angles, a plurality of weights adapted to be carried in their non-acting position by said jaws, a scale lever, a plurality of jaws formed at one end of said scale lever, each pair of jaws being adapted to receive one of said weights, a linkage for rotating the spindle for depositing or removing the said weights on or from the jaws on the scale lever, means disposed external to the apparatus for actuating the said linkage, and means for ensuring the correct positioning of the said actuating means.

4. A weighing apparatus comprising a rotatable spindle, a plurality of jaws secured on said spindle at varying angles, a plurality of weights adapted to be carried in their non-acting position by said jaws, a scale lever, a plurality of jaws formed at one end of said scale lever for receiving said weights, a crank connected to said spindle, a bell crank lever, a rod connecting said crank and one arm of said bell crank lever and means for ensuring the correct positioning of the said actuating lever.

In testimony whereof, I have signed my name to this specification.

WILLIAM TIMSON.